C. T. NUSS.
VALVE CAP AND PRESSURE INDICATOR.
APPLICATION FILED MAY 10, 1919.
1,361,285.
Patented Dec. 7, 1920.
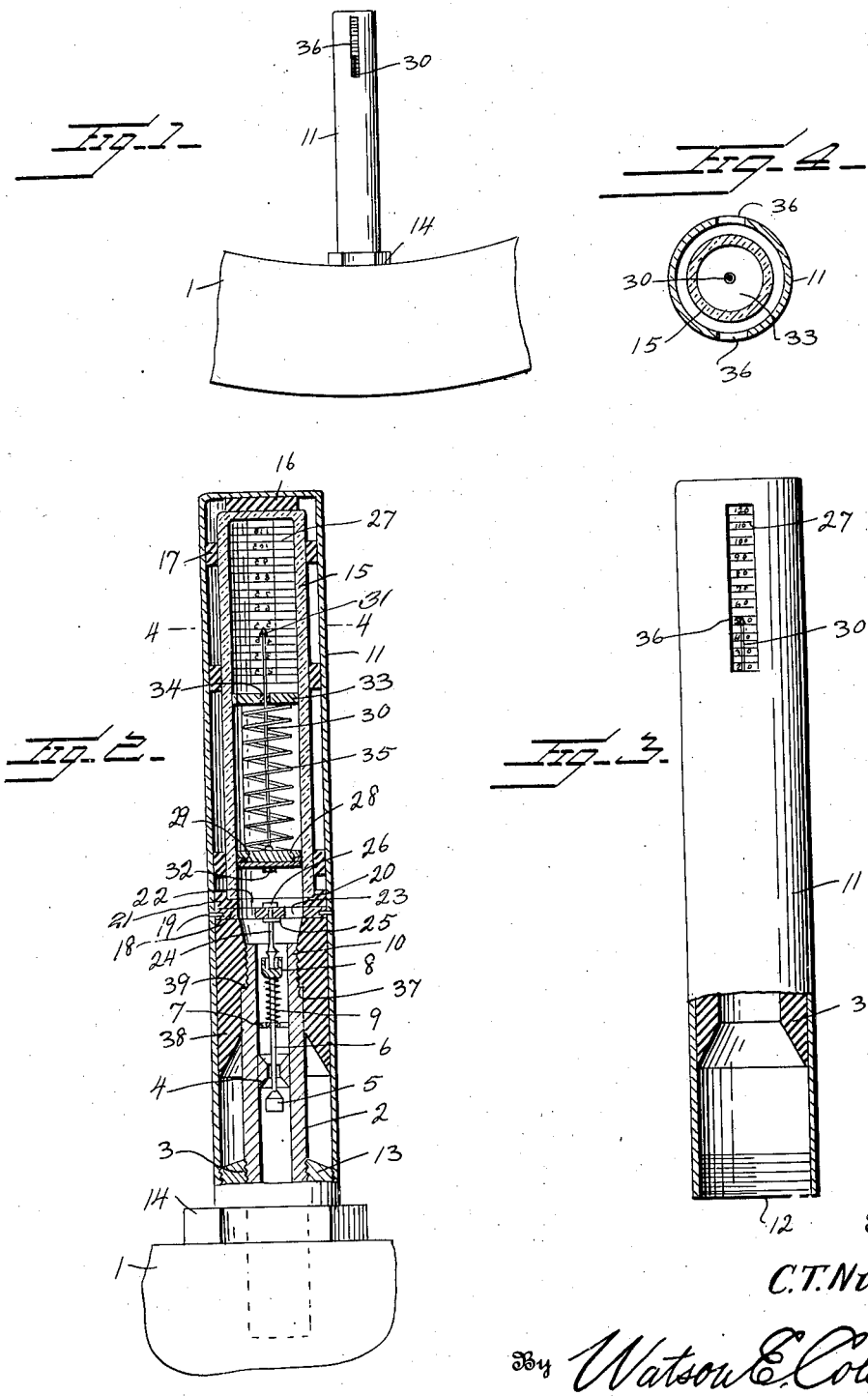
Inventor
C. T. Nuss
By Watson E. Coleman
Attorney

UNITED STATES PATENT OFFICE.

CARL T. NUSS, OF JAMESTOWN, NORTH DAKOTA.

VALVE-CAP AND PRESSURE-INDICATOR.

1,361,285.　　　　　Specification of Letters Patent.　　Patented Dec. 7, 1920.

Application filed May 10, 1919. Serial No. 296,221.

*To all whom it may concern:*

Be it known that I, CARL T. NUSS, a citizen of the United States, residing at Jamestown, in the county of Stutsman and State of North Dakota, have invented certain new and useful Improvements in Valve-Caps and Pressure-Indicators, of which the following is a specification, reference being had to the accompanying drawings.

This invention relates to a combination inflating valve cap and air pressure indicator, the valve cap being adapted to be carried either by the rim, or in the tool chest or storage receptacle of the automobile or the like.

This invention aims to provide a simple and improved inflating valve cap, which has been found practical, and may be manufactured and sold reasonably.

The invention further aims to provide means for carrying an air pressure indicator in the cap, there being means afforded for unseating the inflating valve when the cap is applied, thereby allowing the escape of air from the tire, in order to actuate the indicator.

The invention further aims to provide a device for ascertaining the amount of air pressure in the tire, it being possible that the device may be carried permanently by the rim, so that at all times the pressure may be ascertained. Should the pressure be low, the cap may be easily removed, and upon removal of the cap the inflating valve will return to its seat, in order to retain the remaining air in the tire. By attaching the tube of an air pump to the inflating valve casing, additional air may be injected into the tire. Subsequently, the valve cap and its indicator may be reconnected to the inflating valve casing, unseating the inflating valve, in which case the pressure indicator will be actuated to indicate on the scale the pressure of air in the tire. The cap may remain permanently attached, but if desired the cap may be removed and placed in the tool chest of the automobile, in which case a conventional form of cap may be attached to the inflating valve casing, to avoid dust and the like from entering.

A further object of the invention is to provide spacing cushioning means between the wall of the cap and the glass shell of the pressure indicator, thereby preventing the displacement of the tube, and at the same time maintaining same in its necessary position, and also preventing it from becoming shattered, incident to the vibration of the structure.

A further aim of the invention is the provision of openings in the wall of the cap, whereby the readings of the graduations on the pressure indicator glass are visible.

The construction and arrangement of parts at the present time are believed to be preferable. However, when reducing the invention to a practical form for commercial purposes, alterations may arise, and the right to these alterations is claimed, provided they are comprehended within the scope of what is claimed.

The invention comprises further features and combination of parts, as hereinafter set forth, shown in the drawings and claimed.

In the drawings:

Figure 1 is a view in side elevation of the improved combination inflating valve cap and air pressure indicator, as applied to a portion of the rim of a wheel.

Fig. 2 is a vertical sectional view through the same showing the inflating valve unseated.

Fig. 3 is a vertical sectional view showing the valve cap and the pressure indicator detached from the rim.

Fig. 4 is a sectional view on line 4—4 of Fig. 2.

Referring to the drawings, particularly to Figs. 1 and 2, 1 designates a rim of a wheel, which is provided with a conventional form of inflating valve tube 2, and its securing means 3. Ordinarily a suitable coupling, (not shown) of a tube of a pneumatic pump is designed to be connected to the inflating valve tube, whereby the requisite amount of air may be injected into the tire. The inflating valve tube 2 upon its interior wall is provided with a valve seat 4, with which a valve 5 coöperates, in order to prevent the escape of air from the tire, after once having been injected thereinto. The valve 5 has a stem 6, which is mounted in a guide 7. This guide is in the form of transverse web which forms an integral part of the inflating valve tube 2. The upper end of the valve stem is provided with a socket 8. Inclosed between the wall of the socket and the web 7 is an expansible coil spring 9, the action of which holds the inflating valve 5 normally seated. The extremity of the inflating valve tube has a reduced portion 10, which is threaded, in order to be engaged by a coupling member of the tube of a pneumatic pump. It is well known that upon actuating the pneumatic pump (not shown) the force of air therefrom entering the valve tube, unseats the inflating valve, allowing the air to enter the tire.

The inflating valve cap comprises an elongated cylindrical tubular casing 11, one end being closed, the other open as shown at 12, and adjacent thereto the interior wall of the tubular casing is threaded, so as to engage the threads of the boss 13 of the nut 14, thereby holding the tubular casing 11 firmly in place, the inflating valve tube extending thereinto.

Positioned in the casing 11 and spaced from the wall thereof is a glass tube 15. One end of this glass tube is closed, and interposed between the closed end and the closed end of the tubular casing 11 is a suitable rubber cushion 16. The surrounding space of the glass tube receives a plurality of rubber cushioning rings 17. Arranged in the casing 11 at a point substantially intermediate its ends is a metallic disk plate 18. This plate 18 may be secured in position in any suitable manner preferably by means of the screws or pins 19. The lower marginal edge of the open end of the glass tube engages an annular recess 20 in the upper face of a rubber cushioning disk 21, which rests on the plate 18.

This cushioning disk has an opening 22 of a diameter corresponding to the inner diameter of the glass tube. The plate 18 is supplied with suitable air passages or openings 23. Secured to the plate and depending therefrom is a valve unseating stem or needle 24. This unseating stem when the casing 11 is applied as illustrated in Fig. 2 engages the socket 8, of the enlargement of the valve stem 6 and unseats the valve 5, against the action of the spring 9, thereby permitting the escape of air from the inner tube of the tire, through the passages or openings 23 and into the chamber of the pressure indicator glass 15. This valve unseating stem has an integral collar 25, which contacts with the under face of the plate 18, there being a nut 26 on the extremity of the stem 24, and in contact with the upper face of the plate 18, thereby securely connecting the stem to the plate 18.

It is obvious that by means of the cushioning disk 21 and the cushion 16 and cushioning rings 17, the glass tube is held in position securely, and in such a manner as to avoid shattering of the stem, incident to the vibration of the wheel, in case the device is carried permanently by the rim thereof.

Upon diametrically opposite portions of the outer surface of the glass suitable graduations 27 are provided. Mounted in the glass tube for vertical movement, incident to the increase or decrease of the air pressure in the tire, is a suitable disk float 28, provided with conventional packing means 29, in order to insure an air-tight fit with the inner circumference of the glass tube. Carried by the float and concentric therewith is an indicator needle 30 provided with an arrow-head 31. This needle 30 is secured at 32 to the float. Fixed in any suitable manner, preferably by cementing or the like, on the interior of the glass tube, and intermediate its ends is an air-tight fixed plate 33. The indicator needle 30 is guided through a packing gland 34. It is obvious that this packing gland should not offer any resistance to the needle during its movement incident to the movement of the float. Interposed between the plate 33 and the float, and in surrounding relation with the needle 30 is an expansible coil spring 35, against the action of which the float is moved, when the air escapes through the passages or openings 23.

It is obvious that after pumping up the tire, it subsequently becomes necessary to ascertain the air pressure. This is accomplished by applying the inflating valve cap in the manner shown in Figs. 1 and 2, and in so doing the stem 24 will engage the socket 8 of the enlargement of the valve stem and unseat the valve 5. The air will escape from the tire and through the passages 23, thereby acting upon the float. The float consequently moves against the action of the spring, in which case the arrow head will coöperate with the graduations, and obviously, the readings of the scale are readily visible, through the diametrically disposed slots or openings, 36 of the casing 11.

The inflating valve tube 2 has an annular exterior shoulder 37. Arranged within the casing 11 is a rubber cushioning sleeve 38, which may be secured in the casing by any suitable means, such as by cement or the like. This cushioning sleeve has an interior shoulder 39, to operate with the shoulder 37. It is obvious that the sleeve 38 cushions the casing 11, with relation to the valve inflating tube 2.

The invention having been set forth, what is claimed as new is:

1. The combination with an inflating valve tube provided with a valve, of a tubular casing fitting over and in spaced relation with the inflating valve tube, an air pressure indicating means within one end of said casing, said means comprising a supporting plate provided with air passages, a glass tube engaging on said plate, and being spaced from the interior wall of the casing, cushioning means in the space between the glass tube and the casing, said glass tube having an air pressure scale, and a spring tensioned air pressure actuated float mounted within the glass tube provided with an indicator needle to coöperate with said scale, and means for unseating the inflating valve, whereby the air pressure may actuate the float.

2. The combination with an inflating valve tube, of a tubular casing arranged thereover and in spaced relation thereto, cushioning means in the space between the valve tube and the casing, a plate on the cushioning means provided with air passages, a cushion on the plate, a glass tube on the cushion of the plate, cushioning means between one end of the glass tube and one end of the casing, said glass tube being in spaced relation with the wall of the casing, cushioning means between the glass tube and the casing, said glass tube having an air pressure scale, an air pressure actuated spring tensioned float within the glass tube and provided with an indicator needle, to coöperate with said scale, and means for unseating the inflating valve, whereby the air may actuate the float.

3. The combination with an inflating valve tube, of a tubular casing fitting over the tube, of means for spacedly connecting said casing to said tube, a cushioning sleeve fixed within the casing and being in close surrounding and bracing relation to the outer end of said tube, a plate on said cushioning sleeve above the tube and fixed in the casing and provided with a check valve unseating member, a cushioning disk on said plate, a glass tube having one end engaging into the disk and having communication through the disk and the plate with said inflating valve tube, cushioning means for spacing the glass tube from the inner wall of the casing, said glass tube having an air pressure scale, an air pressure actuated spring tensioned float within the glass tube and provided with an indicator needle to coöperate with the scale, and means on the interior of the glass tube for guiding the indicator needle.

In testimony whereof I hereunto affix my signature in the presence of two witnesses.

CARL T. NUSS.

Witnesses:
C. S. BUCK,
SOPHIE PEISER.